(12) United States Patent
Yoshida et al.

(10) Patent No.: US 7,953,281 B2
(45) Date of Patent: May 31, 2011

(54) ENCODED IMAGE SIGNAL CONVERSION METHOD AND APPARATUS

(75) Inventors: Daisuke Yoshida, Yokohama (JP); Yuichi Kubo, Odawara (JP); Keisuke Inata, Ebina (JP)

(73) Assignee: Hitachi, Ltd., Tokyo (JP)

( * ) Notice: Subject to any disclaimer, the term of this patent is extended or adjusted under 35 U.S.C. 154(b) by 1512 days.

(21) Appl. No.: 11/260,436

(22) Filed: Oct. 28, 2005

(65) Prior Publication Data

US 2006/0119536 A1    Jun. 8, 2006

(30) Foreign Application Priority Data

Sep. 6, 2004   (JP) ................................. 2004-257830

(51) Int. Cl.
*G06K 9/36* (2006.01)
(52) U.S. Cl. .................................. 382/232; 375/240.16
(58) Field of Classification Search ............. 375/240.16, 375/E7.104, E7.106, E7.123, E7.164, E7.198, 375/E7.209, E7.256; 704/E19.049
See application file for complete search history.

(56) References Cited

U.S. PATENT DOCUMENTS

| | | | |
|---|---|---|---|
| 5,497,191 A * | 3/1996 | Yoo et al. ................... 348/208.6 |
| 6,028,639 A | 2/2000 | Bhatt et al. | |
| 6,072,548 A * | 6/2000 | Schoner et al. .......... 375/240.26 |
| 6,075,918 A * | 6/2000 | Strongin et al. ............... 386/326 |
| 6,370,323 B1 * | 4/2002 | Adolph et al. ................ 386/104 |
| 6,642,967 B1 | 11/2003 | Saunders | |
| 2005/0226526 A1 * | 10/2005 | Mitsunaga .................... 382/274 |

FOREIGN PATENT DOCUMENTS

| | | |
|---|---|---|
| JP | 2000-059788 | 2/2000 |
| JP | 2001-189940 | 7/2001 |
| JP | 2001-268578 | 9/2001 |
| JP | 2001-527347 | 12/2001 |
| JP | 2002-152735 | 5/2002 |
| JP | 2002-320228 | 10/2002 |
| JP | 2002-344883 | 11/2002 |
| JP | 2003-61089 | 2/2003 |
| JP | 2003-116104 | 4/2003 |
| JP | 2003116104 A * | 4/2003 |
| JP | 2003-264840 | 9/2003 |

\* cited by examiner

*Primary Examiner* — Gregory F Cunningham
(74) *Attorney, Agent, or Firm* — Antonelli, Terry, Stout & Kraus, LLP.

(57) ABSTRACT

A transcoding method and apparatus designed to reduce, with a high picture quality, the computation processing volume required for transcoding are provided. A recording and reproduction apparatus 100 includes an encoder 101, a transcoder 102, an intermediate information storage memory 105, a stream storage memory 106, a compression expansion means 107, an input image storage memory 108, and a user interface 110. When performing encoding in an encoder 104 with a second compressive encoding method, the intermediate information is read from the intermediate information storage memory 105, processed into a utilizable format, and utilized during encoding with the second compressive encoding method.

10 Claims, 5 Drawing Sheets

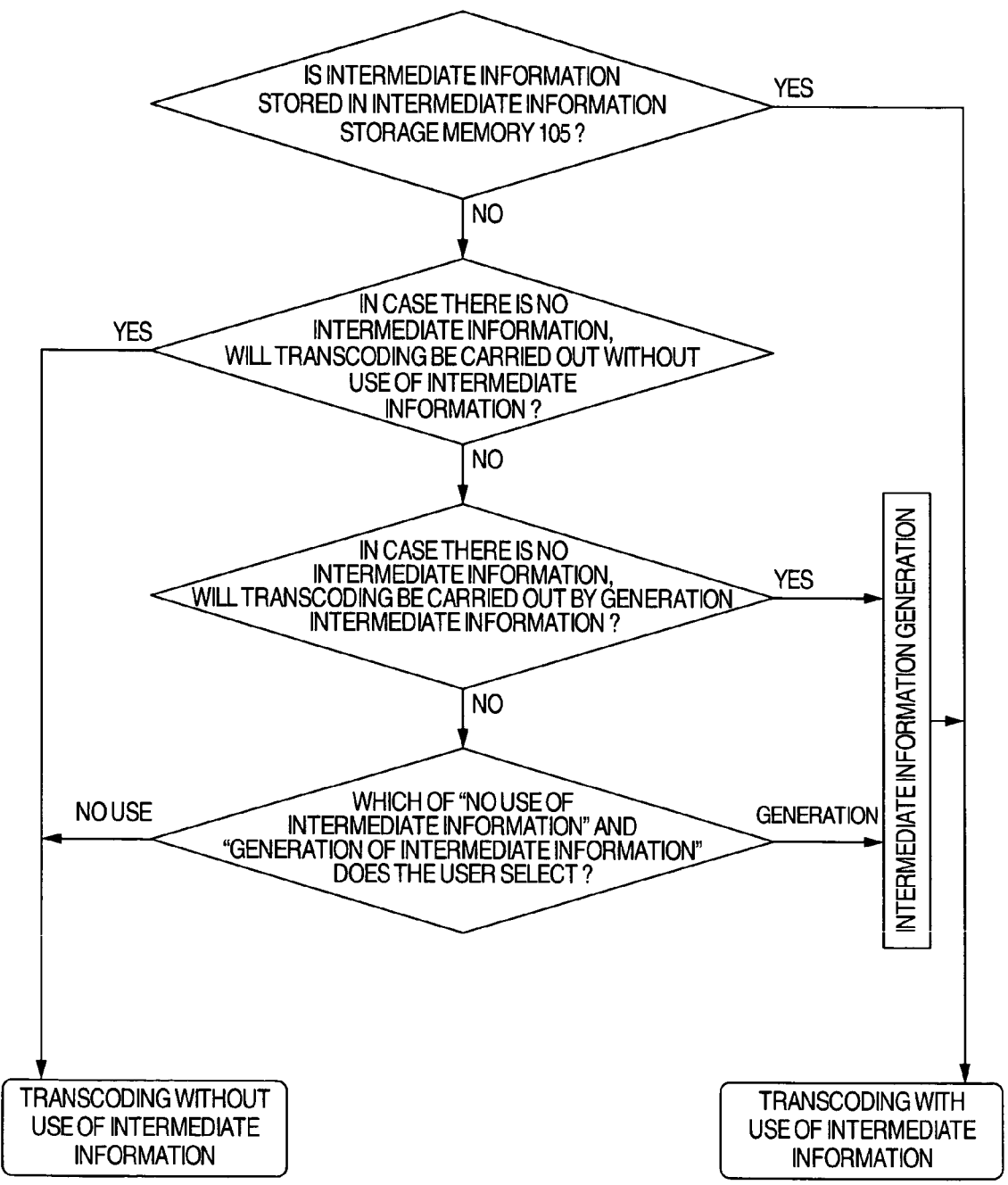

ENCODED IMAGE SIGNAL CONVERSION METHOD AND APPARATUS

BACKGROUND OF THE INVENTION

This invention pertains to an encoding method for, as well as a transcoding method and apparatus for transcoding the bit rate of, an encoded video stream encoded with some encoding method.

Through the swift growth of moving image processing technology in recent years, objects/devices handling moving images have come to be wide-ranging. Further, since the data volume of moving images generally becomes very large, it is common to make the data available after performing compressive encoding in the case of handling moving images as digital data.

Conventionally, compressive encoding is used which corresponds to the objective of use and the targeted device, and there is carried out transcoding in converting moving image data compressively encoded with some encoding method to data having a different encoding method, with the objective of sharing data between different devices. Moreover, without changing the compressive encoding method, operations like modifying the size and the frame rate of the moving images and increasing the compression ratio are carried out to make the bit rate suitable to the use.

For conversions like these, a method is adopted in which, after temporarily decoding bit stream of the transcoding source, it is recoded with the desired encoding format, but for the purpose of reducing the transcoding processing load on that occasion, techniques of performing recoding using intermediate information during transcoding are proposed in JP-A-2003-264840, JP-A-2003-116104, JP-A-2003-61089, JP-A-2002-320228, and JP-A-2001-268578.

However, since, in transcoding with the aforementioned conventional technology, the first frame is decoded and the intermediate information obtained on the occasion of this first decoding is directly used for the encoding of the first frame, it has not been possible to use the intermediate information of the not yet decoded second and third frames for the encoding of the first frame.

SUMMARY OF THE INVENTION

It is an object of this invention to provide a method and an apparatus capable of utilizing, on the occasion of the recoding in the transcoding of the first frame, the intermediate information of the second and third frames.

This invention is directed to an encoded video stream transcoding method transcoding a first encoded video stream into a second video stream wherein the input signal is compressed with a first compressive encoding method; the intermediate encoding information, which is generated before converting, with a second compressive encoding method, the encoded video stream compressed with the first compressive encoding method is stored; and the stored intermediate encoding information is chosen to be used when converting, with the second compressive encoding method, the encoded video stream transcoded with the first compressive encoding method.

With this invention, it is possible to implement transcoding and rate conversion with high picture quality.

Other objects, characteristics, and advantages of the present invention should become obvious from the description of the embodiments, of the present invention, pertaining to the accompanying drawings and mentioned hereinafter.

BRIEF DESCRIPTION OF THE DRAWINGS

FIG. 5 is a flowchart showing the flow of the judgment process occurring in an intermediate information use/non-use determination means 1043.

DESCRIPTION OF THE EMBODIMENTS

First Embodiment

Figure 1:
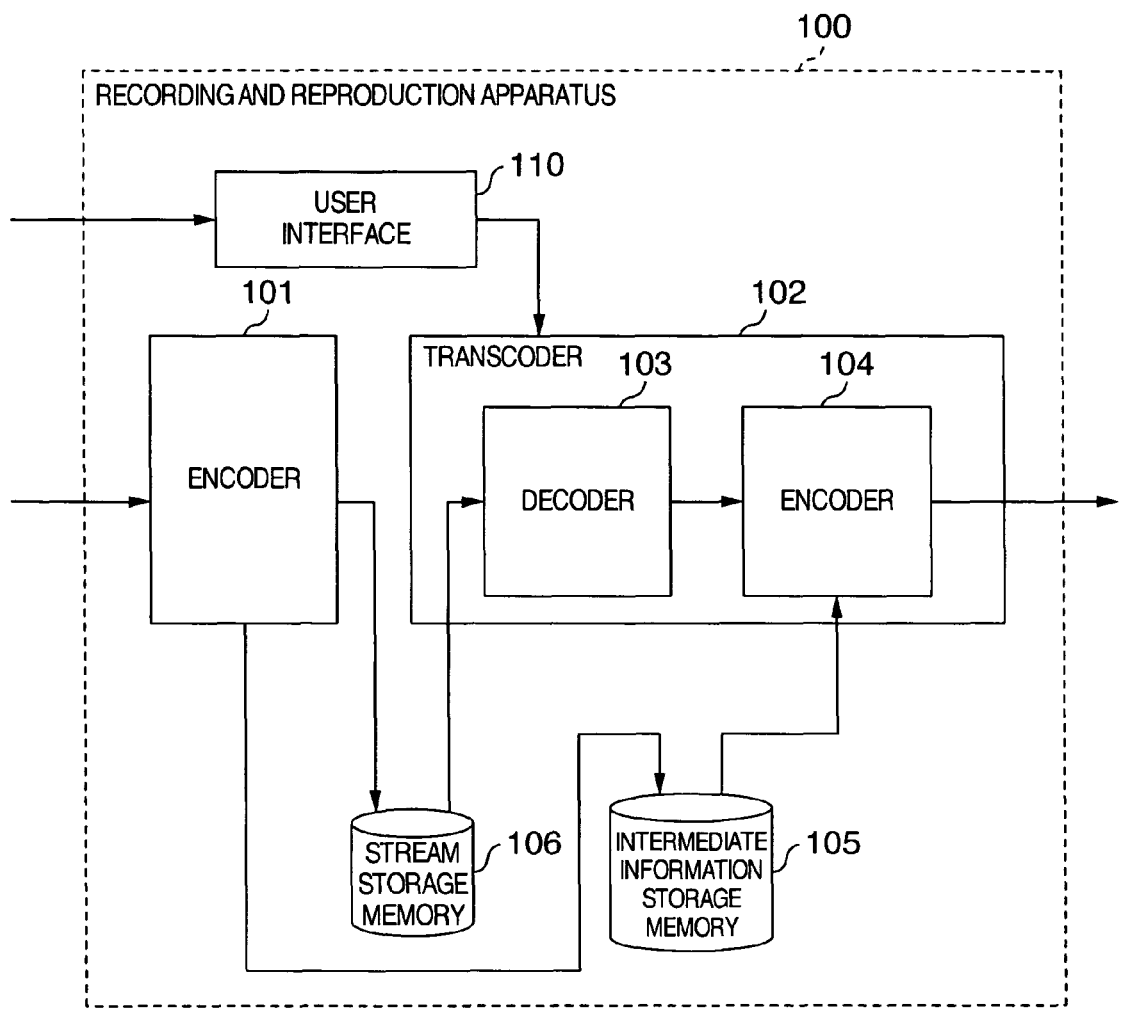
FIG. 1 is a diagram showing a first embodiment of this invention.

A configuration related to Embodiment 1 of this invention is shown in FIG. 1.

An image recording and reproduction apparatus compresses an input digital video stream by means of a first compressive encoding technology (e.g. MPEG2, Moving Pictures Expert Group 2) and stores it in a storage medium like a hard disk. Further, stream transcoding is implemented by decoding the first encoded video stream and encoding it with a second compressive encoding method (e.g. MPEG4).

A recording and reproduction apparatus 100 is constituted by having an encoder 101, a transcoder 102, an intermediate information storage memory 105, a stream storage memory 106, and a user interface 110. The user interface 110 is not a mandatory one, the interface being used as an interface in the case of user's controlling the operation of transcoder 102. The intermediate information storage memory 105 and the stream storage memory 106 may be respectively constituted by independent storage media, or may be constituted by the same storage medium.

The encoder 101 encodes a digital video stream inputted from outside the recording and reproduction apparatus 100 with a first compressive encoding method and outputs a first encoded video stream. The output first encoded video stream is outputted to the stream storage memory 106 and stored. Moreover, the intermediate information generated when encoding the digital video stream inputted from the exterior by means of the encoder 101 is outputted to the intermediate information storage memory 105 and stored. Here, the intermediate information refers to motion vectors, quantized values or quantization scales requested at the time of the encoding, the statistics of changes in brightness between the temporally preceding and succeeding frames, temporal transitions of the bit rate, etc.

The transcoder 102 is constituted by having a decoder 103 and an encoder 104. The first encoded video stream read from the stream storage memory 106 is supplied to the decoder 103. The decoder 103 decodes the supplied first encoded video stream and outputs a digital video stream. Further, the decoder 103 possesses a function of modifying the video size and frame rate of the decoded digital video stream, there being some cases where the video size and frame rate of the digital video stream which is outputted from the decoder 103 are unchanged from those following the decoding of the first encoded video stream and others where the signal undergoes operations inside the decoder 103 like scaling to an appropriate video size and regulation to an appropriate frame rate. The encoder 104 encodes the digital video stream which is outputted from the decoder 103 with a second compressive encoding method and outputs a second encoded video stream. Here, the intermediate information produced when performing encoding with the first compressive encoding method is stored in the intermediate information storage memory 105, and, on the occasion of performing encoding with the second compressive encoding method in encoder 104, the aforementioned intermediate information is read from the intermediate information storage memory 105, shaped into a utilizable format, and utilized during the encoding with the second compressive encoding method.

For example, when the second compressive encoding method is MPEG4, a great amount of computation is required in order to request the motion vectors during encoding. Further, in order to request the motion vectors, the pixel values of the temporally preceding and succeeding frames are necessary, so there is a need to ensure memory for holding this. In the present method, the motion vectors, being the intermediate information produced on the occasion of compressing with the first compressive encoding method, are read from the intermediate information storage memory, these being scaled/micro-regulated so as to comply with the video size and frame rate in the case of performing the second compressive encoding, and are utilized in the second compressive encoding. By this method, a reduction in the quantity of computation for requesting the motion vectors and a saving in the memory for holding frames become possible.

Further, in a separate example, utilizing the statistics of the temporal changes in the brightness values, being the intermediate information when making a compression with the first compressive encoding method, it is also possible to utilize the bit rate control when performing the second compressive encoding. Specifically, there is a method of applying rate control so that videos are obtained with visually high picture quality by not allocating a big code volume to portions with violent brightness value changes and rather allocating code volume to portions with small brightness changes.

Moreover, in yet a separate example, it is also possible to perform a control of the bit rate when carrying out the second compressive encoding by using the quantized values and the quantization scale, or the transitions of the bit rate, when making a compression with the first compressive encoding method. In the present embodiment, since there already exists intermediate information generated when encoding the video signal inputted from the exterior, it is also possible to carry out a more optimal bit rate control by feeding back bit rate transitions or the quantized value transitions. In this way, rate control is possible which follows without delay the bit rate transitions when compressing with the first compressive encoding method.

Through a user interface 110, it is possible to carry out control from the user side so as to obtain the desired operation for the transcoder 102 as well as the decoder 103 and the encoder 104. Specifically, the bit rate setting of encoder 104 and the output video size and frame rate of decoder 103 can be set.

The above-mentioned first compressive encoding method and second compressive encoding method may be the same method or may be different methods.

Further, it is acceptable to have a configuration set up to make common part or all of encoder 101 and encoder 104.

Also, the intermediate information produced when making a compression with the first compressive encoding method may normally be stored at the time of the encoding, or storage may be carried out only in case the threshold value for the set bit rate during encoding is exceeded, i.e. in the case of encoding with high picture quality. The user may designate whether the intermediate information is stored, by using the user interface 110.

Second Embodiment

Figure 2:
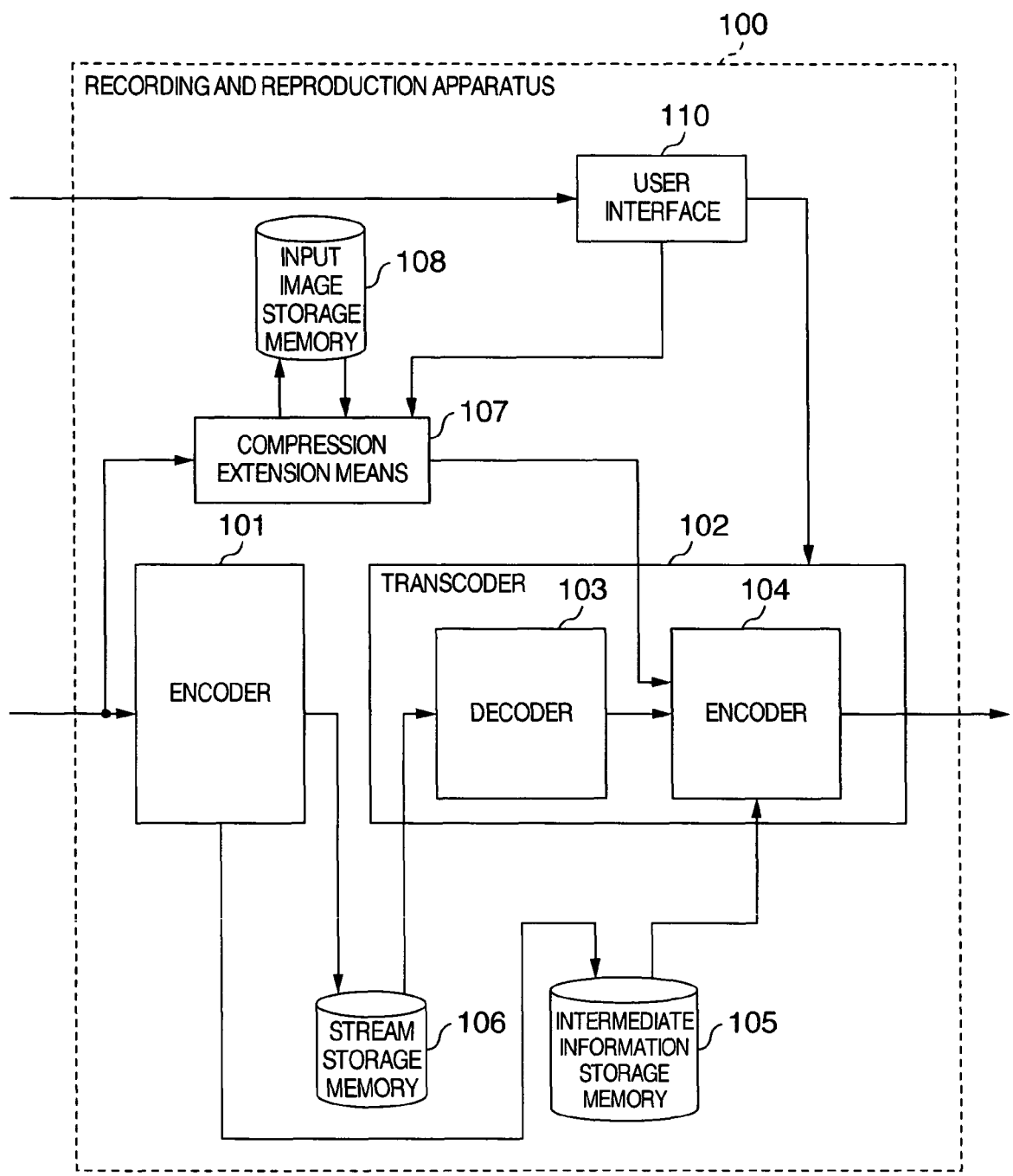
FIG. 2 is a diagram showing a second embodiment of this invention.

A configuration related to Embodiment 2 of this invention is shown in FIG. 2.

A video recording and reproduction apparatus compresses an input digital video stream by means of a first compressive encoding technology (e.g. MPEG2) and records it in a storage medium like a hard disk. At the same time, the input digital video stream itself is recorded in the storage medium, either compressed or not compressed. Moreover, by encoding the digital video stream decoded from the first encoded video stream, or the digital video stream recorded in the storage medium, with a second compressive encoding method (e.g. MPEG4), stream conversion is implemented.

A recording and reproduction apparatus 100 is constituted by having the encoder 101, the transcoder 102, the intermediate information storage memory 105, the stream storage memory 106, the compression extension means 107, the input video storage memory 108, and the user interface 110. The user interface 110 is not a mandatory one, the interface being used as an interface in the case of user's controlling the operation of transcoder 102 and compression extension means 107. The intermediate information storage memory 105, the stream storage memory 106, and the input video storage memory 108 may be respectively constituted by independent storage media, or may be constituted by the same storage medium.

Since the operation of encoder 101, intermediate information storage memory 105, and stream storage memory 106 is the same as in Embodiment 1, an explanation thereof will be omitted here.

The input digital video stream supplied to the encoder 101 is also supplied simultaneously to the compression extension means 107. The compression extension means 107 stores the input digital video stream, left uncompressed or after compression with some compression method, in the input video storage memory 108. Here, the compression method may be any of a method in which the difference in pixel value with the previous frame is entropy coded, a method in which the difference with the left pixel value is entropy coded, a reversible compression method such as LZH (Lempel Ziv Haruyasu) or ZIP, and an irreversible compression method such as JPEG (Joint Photographic Expert Group), GIF (Graphics Interchange Format), or PNG (Portable Network Graphics).

Further, there may be provided a mechanism of judging the properties of the input digital video stream by an analytical means, such as the operation of filtering, and selecting an appropriate compression method in response to the properties thereof. For example, there may be installed a mechanism performing switching which consists of carrying out a Sobel filter computation of edge extraction with respect to the input digital signal, i.e. adopting a compression method such as GIF or PNG for videos with many spots having sharp changes in brightness and carrying out compression with the JPEG method relative to videos which have smooth changes in brightness.

Also, the selection of compression/non-compression, the selection of compression method, the selection of compression rate, when storing the input digital video stream in the input image storage memory 108, can be controlled by the user via the user interface 110.

During transcoding operation, the input digital video stream stored in the input image storage memory 108 is read by compression extension means 107 and, in case the signal is compressed, extension is carried out and the signal is supplied to the encoder 104. In case the signal is not compressed, it is supplied unchanged to the encoder 104. Here, the compression extension means 107 has the function of changing the video size and frame rate of the input digital video stream, there being some cases where the digital video stream which is outputted from the compression extension means 107 is unchanged from that following the decoding of the first encoded video stream and others where the signal undergoes operations like scaling to an appropriate size and regulation to an appropriate frame rate in the compression extension means 107.

Since the operation of decoder 103 included in the transcoder 102 is the same as in Embodiment 1 of this invention, an explanation thereof will be omitted here.

Figure 3:
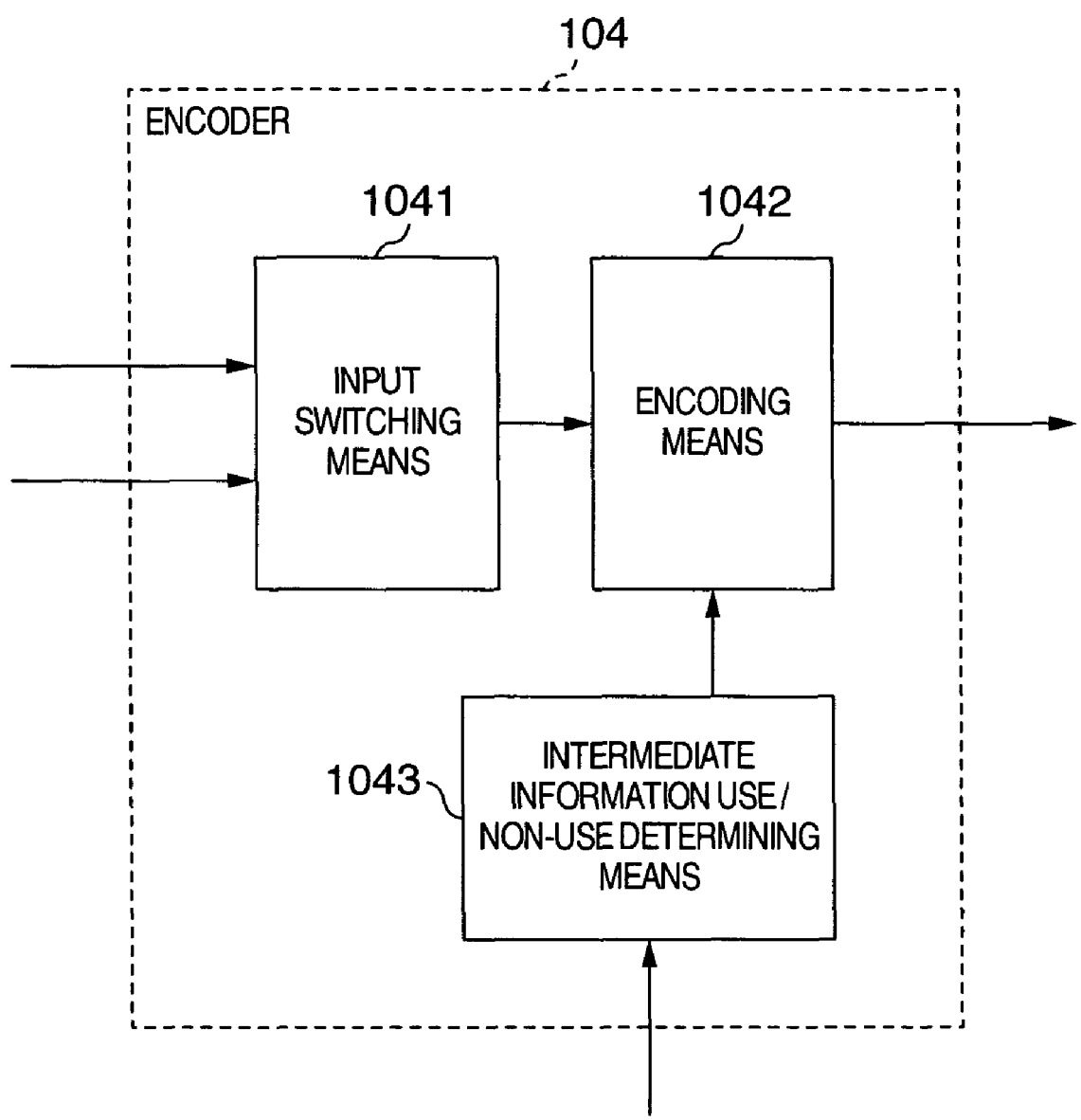
FIG. 3 is a diagram showing the internal configuration of an encoder 104.

The configuration of encoder 104 is shown in FIG. 3. The encoder 104 is constituted by having an input switching means 1041, an encoding means 1042, and an intermediate information use/non-use determining means 1043.

In the input switching means 1041, the input digital video stream supplied from the compression extension means 107 and the decoded digital video stream supplied from the decoder 103 are supplied and appropriately switched and outputted to the encoding means 1042. The control of the input switching can be directly controlled by the user via the user interface 110.

The encoding means 1042 encodes, with the second compressive encoding method, the digital video stream supplied from the input switching means 1041 and outputs a second encoded video stream. Here, there is stored in the intermediate information storage memory 105 the intermediate information produced when performing encoding with the first compressive encoding method and, when performing encoding with the second compressive encoding method in the encoder 104, the intermediate information use/non-use determining means 1043 reads the aforementioned intermediate information from the intermediate information storage memory 105, processes the signal into a utilizable format, and uses it when encoding with the second compressive encoding method. Regarding this specific example, since it is the same as in Embodiment 1 of this invention, an explanation thereof will be omitted.

The intermediate information use/non-use determining means 1043 carries out switching between encoding performed utilizing the intermediate information and encoding performed without referring to the intermediate information. The control of the switching can be controlled from the user side via the user interface 110.

Here, when the case is considered where an input digital video stream was handled in the compression extension means 107 with no compression or reversible compression, and when the input digital video stream supplied with the input switching means 1041 from the compression extension means 107 is selected, it becomes possible, since there is absolutely no video quality degradation due to the compression extension of the digital video stream supplied to the encoding means 1042, to implement transcoding with very high picture quality. Further, in the same way as explained for Embodiment 1 of this invention, it is also possible to reduce the processing volume needed for transcoding by utilizing the data stored in the intermediate information storage memory 105.

Further, it is possible to provide a mechanism set up to discriminate whether the information produced when making a compression with the first compressive encoding method is present in the intermediate information storage memory 105 and record intermediate information only in the case where intermediate information is not present.

Third Embodiment

Figure 4:
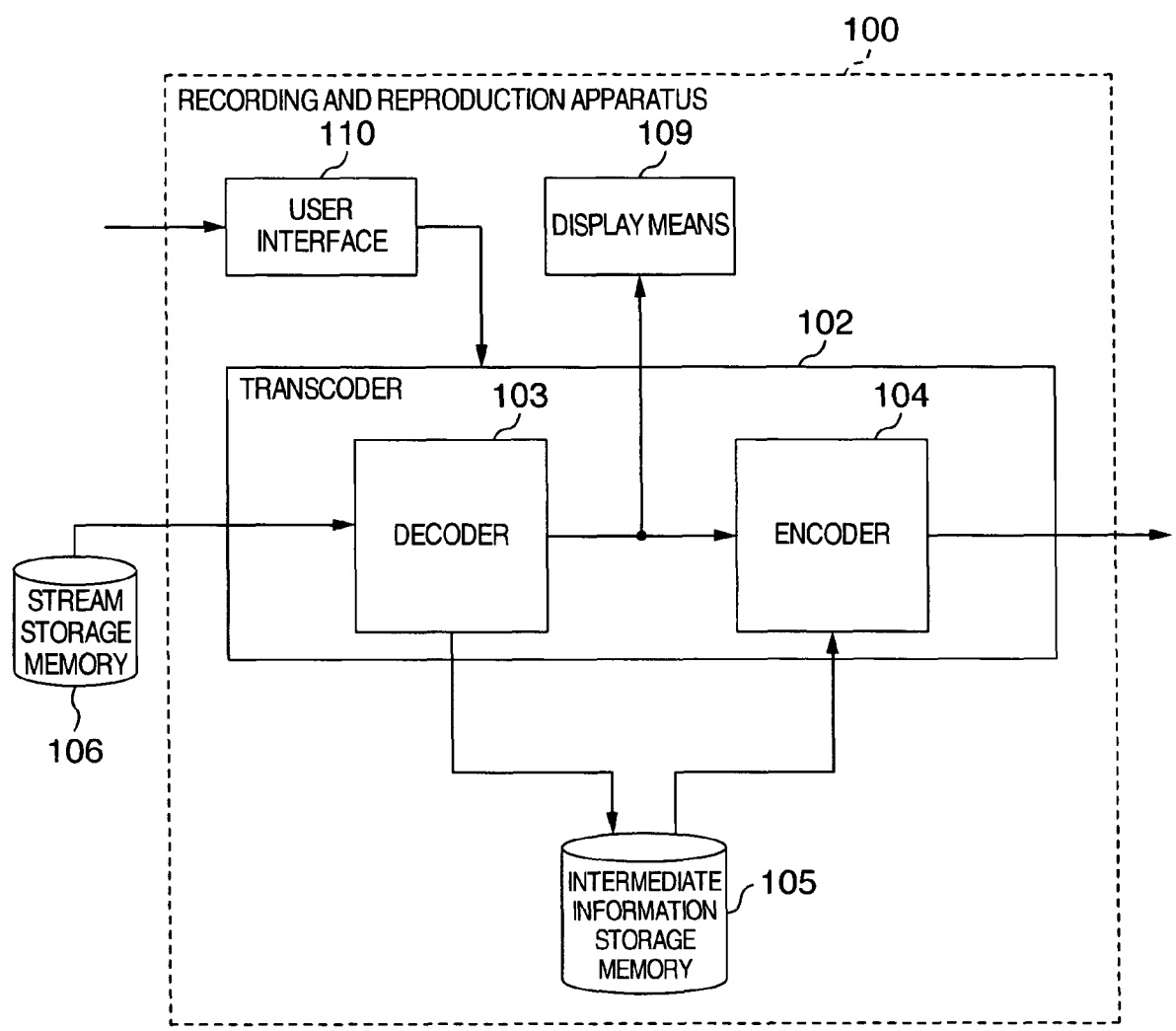
FIG. 4 is a diagram showing a third embodiment of this invention.

A configuration related to Embodiment 3 of this invention is shown in FIG. 4.

The present embodiment decodes a first encoded video stream, which is inputted into a recording and reproduction apparatus and encoded with a first encoding method, and generates a second encoded video stream encoded by means of a second encoding method.

The recording and reproduction apparatus 100 is constituted by having the transcoder 102, the intermediate information storage memory 105, the display means 109, and the user interface 110.

The first encoded video stream is inputted from outside the recording and reproduction apparatus 100, e.g. from the stream storage memory 106, and supplied to the transcoder 102. As for the first encoded video stream, apart from what is described above, there can also be cases where the signal is supplied from an external storage medium like a DVD medium or from the Internet or the like.

The transcoder 102 is constituted by having the decoder 103 and the encoder 104. The first encoded video stream read from the stream storage memory 106 is supplied to the decoder 103. The decoder 103 decodes the supplied first encoded video stream and outputs a digital video stream. Further, the decoder 103 possesses a function of modifying the video size and frame rate of the decoded digital video stream, there being some cases where the video size and frame rate of the digital video stream which is outputted from the decoder 103 are unchanged from those following the decoding of the first encoded video stream and others where the signal undergoes operations inside the decoder 103 like scaling to an appropriate size and regulation to an appropriate frame rate. Moreover, the intermediate information extracted from the first encoded video stream is also simultaneously outputted from the decoder 103, and stored in the intermediate information storage memory 105 on the occasion of the decoding. Here, intermediate information refers to motion vectors, quantized values or quantization scales extracted at the time of the encoding, the statistics of the change in brightness between the temporally preceding and succeeding frames, the temporal transition of the bit rate. In the present embodiment, the decoder 103 is handled as a constituent element of transcoder 102, but it is also acceptable to adopt a configuration in which the decoder is instead connected to the exterior of transcoder 102 and the first encoded video stream is decoded by using the decoder.

The encoder 104 encodes the digital video stream which is outputted from the decoder 103 with a second compressive encoding method and outputs a second encoded video stream. Here, the intermediate information extracted from the first compressively encoded stream is stored in the intermediate information storage memory 105 and, when performing encoding with the second compressive encoding method in the encoder 104, the afore-mentioned intermediate information is read from the intermediate information memory 105, processed into a utilizable format, and utilized during encoding with the second compressive encoding method. Regarding this specific method, an explanation thereof will be omitted, since it is the same as in Embodiment 1 of this invention.

The timing of decoding the first compressively encoded stream in the decoder 103 and simultaneously extracting intermediate information and reading it into the intermediate information storage memory 105 is arbitrary, e.g., it is acceptable to decode the first compressively encoded stream stored in the stream storage memory 106 and carry out the storage of the intermediate information in the reproducing and displaying background environment via the display means 109, or alternatively, only the extraction of the intermediate information may be carried out, without displaying it with the display means 109. Further, it is acceptable to automatically distinguish an idling state in which the user performs absolutely no manipulation and carry out extraction and storage of the intermediate information in the background.

Also, particularly in the case where reproduction/display is not carried out, the system may carry out decoding as fast as possible and extract and store the intermediate information.

Since it is unclear whether the intermediate information of the stream being transcoded is present in the intermediate information storage memory 105, the encoder 104 may have a configuration providing a function of discriminating whether the intermediate information of the stream desired to be transcoded is present in the intermediate information storage memory 105. In the present configuration, when it is found as a result of the determination, that there is intermediate information, transcoding is performed utilizing that intermediate information. In case there is no intermediate information, encoding may be performed without using intermediate information, or transcoding may be performed automatically by, after generating intermediate information, utilizing that intermediate information. Moreover, it is acceptable with a configuration having the intermediate information use/non-use determining means in FIG. 3, the use/non-use of the intermediate information being left to the user to select. The aforementioned judgment flow is shown in FIG. 5. Further, as an application example of the present embodiment, the intermediate information of the data portion desired to be transcoded may be prepared in advance when performing the transcoding, or further, by carrying out decoding during the transcoding several frames to several tens of frames ahead of the recoding frame, so future intermediate information can be used, making it possible to follow e.g., the bit rate transitions without delay.

The description above has been given regarding the embodiments, but this invention is not limited thereto, the possibility of carrying out various modifications and revisions within the spirit of the invention and the scope of the appended claims being evident to a person skilled in the art.

The invention claimed is:

1. An encoding method for encoding input video signals by means of a first encoding scheme and a second encoding scheme, comprising:
   encoding the input video signals using the first encoding scheme to generate first encoded video signals with intermediate information;
   storing the intermediate information of plurality of frames separately from the first encoded video signals;
   compressing the input video signals and storing the compressed input video signals;
   reading the compressed input video signals and extending the compressed input video signals; and
   encoding the extended input video signals by means of the second encoding scheme using the stored intermediate information of the plurality of frames.

2. The encoding method according to claim 1, wherein the intermediate information is motion vectors and/or quantized values and/or brightness change statistics and/or rate transition statistics.

3. The encoding method according to claim 1, wherein the compressing and extending operations use one of compression/extension methods including a method in which a difference in pixel value with a previous frame is entropy coded, a method in which a difference with a left pixel value is entropy encoded, reversible compression methods including LZH (Lempel Ziv Haruyasu) and ZIP, and irreversible compression methods including JPEG (Joint Photographic Expert Group), GIF (Graphics Interchange Format) and PNG (Portable Network Graphics).

4. The encoding method according to claim 3, wherein the compression/extension method is switched to GIF or PNG for the input video signals from which many edge spots are detected, and switched to JPEG for the input video signals from which a few edge spots are detected.

5. The encoding method according to claim 3, wherein the compression/extension method is switched to GIF or PNG for the input video signals having sharp changes in brightness, and switched to JPEG for the input video signals having smooth changes in brightness.

6. An encoding apparatus for encoding input video signals by means of a first encoding scheme and a second encoding scheme, comprising:
   a first encoder which encodes the input video signals by means of the first encoding scheme, to generate first encoded video signals with intermediate information;
   an intermediate information storage memory which stores the intermediate information of a plurality of frames, separately from the first encoded video signals;
   a compression extension unit which compresses the input video signals and extends the compressed input video signals;
   an input video signal storage memory which stores the input video signals compressed by the compression extension unit; and
   a second encoder which encodes the input video signals, read from the input video signal storage memory and extended by the compression extension unit, by means of the second encoding scheme using the intermediate information of the plurality of frames stored in the intermediate information storage memory.

7. The encoding apparatus according to claim 6, wherein the intermediate information is motion vectors and/or quantized values and/or brightness change statistics and/or rate transition statistics.

8. The encoding apparatus according to claim 6, wherein the compression extension unit uses one of compression/extension methods including a method in which a difference in a pixel value with a previous frame is entropy coded, a method in which a difference with a left pixel value is entropy encoded, reversible compression methods including LZH (Lempel Ziv Haruyasu) and ZIP, and irreversible compression methods including JPEG (Joint Photographic Expert Group), GIF (Graphics Interchange Format) and PNG (Portable Network Graphics).

9. The encoding apparatus according to claim 8, wherein the compression/extension method is switched to GIF or PNG for the input video signals from which many edge spots are detected, and switched to JPEG for the input video signals from which a few edge spots are detected.

10. The encoding apparatus according to claim 8, wherein the compression/extension method is switched to GIF or PNG for the input video signals having sharp changes in brightness, and switched to JPEG for the input video signals having smooth changes in brightness.

* * * * *